US012707035B1

(12) United States Patent
Strandborg et al.

(10) Patent No.: US 12,707,035 B1
(45) Date of Patent: Aug. 11, 2026

(54) ADAPTIVE IMAGE-REPLICATING DISPLAY

(71) Applicant: Distance Technologies Oy, Helsinki (FI)

(72) Inventors: Mikko Strandborg, Hangonkylä (FI); Urho Konttori, Helsinki (FI); Pekka Äyräs, Helsinki (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/343,354

(22) Filed: Sep. 29, 2025

(51) Int. Cl.
*H04N 13/383* (2018.01)
*H04N 13/111* (2018.01)
*H04N 13/128* (2018.01)
*H04N 13/344* (2018.01)
*H04N 13/398* (2018.01)

(52) U.S. Cl.
CPC ......... *H04N 13/383* (2018.05); *H04N 13/111* (2018.05); *H04N 13/128* (2018.05); *H04N 13/344* (2018.05); *H04N 13/398* (2018.05); *H04N 2213/002* (2013.01)

(58) Field of Classification Search
CPC .. H04N 13/344; H04N 13/383; H04N 13/128; H04N 2213/002; H04N 13/111; H04N 13/398
See application file for complete search history.

(56) References Cited

U.S. PATENT DOCUMENTS

2016/0147067 A1* 5/2016 Hua .................... G02B 27/017 345/419
2021/0132693 A1* 5/2021 Pulli ................. G02B 27/0093
2024/0005826 A1* 1/2024 Zhou ...................... G06F 3/013
2025/0013069 A1* 1/2025 Ota ....................... G02B 30/31

* cited by examiner

*Primary Examiner* — Muhammad N Edun
(74) *Attorney, Agent, or Firm* — Ziegler IP Law Group, LLC.

(57) ABSTRACT

A relative position of an interpupillary midpoint between a first eye and a second eye of a user with respect to an image plane of an image-replicating display is determined. An image to be displayed is generated or retrieved based on the relative position of the interpupillary midpoint with respect to the image plane. This image corresponds to a perspective projection having a view origin at the interpupillary midpoint and aligned with an optical axis of the image-replicating display. The image is displayed via the image-replicating display, which is configured to emit light rays forming a spatially-invariant angular light field from each of a plurality of positions on an exit aperture of the image-replicating display.

17 Claims, 3 Drawing Sheets

ADAPTIVE IMAGE-REPLICATING DISPLAY

TECHNICAL FIELD

The present disclosure relates generally to display technologies; and more particularly, to systems for providing pseudo-multiscopic rendering using an image-replicating display. The present disclosure also relates to methods for providing pseudo-multiscopic rendering using an image-replicating display.

BACKGROUND

Heads-up displays and other augmented-reality (AR) systems aim to present virtual imagery in alignment with a user's natural view of the real world. Achieving a convincing and comfortable visual experience in such systems remains challenging, particularly due to the limitations of current display technologies in reproducing natural depth cues.

Human depth perception relies on several mechanisms, including accommodation (optical focus of the eye), stereo convergence (rotation of the eyes toward a near object), and motion parallax (changes in relative perspective as the head moves). Each of these cues operates over different effective ranges and with different strengths. When these cues are inconsistent with one another, users may experience visual discomfort, fatigue, or reduced immersion.

Generating a fully immersive synthetic light field toward the user's eyes remains a largely unsolved challenge, as it would require reproducing multiple depth cues simultaneously. Among these cues, accommodation is perceptually weak beyond a few metres, stereo convergence becomes unreliable beyond approximately five metres, while head-motion parallax remains a strong and reliable cue at all distances.

Conventional display systems often provide virtual imagery that appears at a fixed optical distance. This can result in a mismatch between the natural focus response of the eye and the required eye convergence, commonly referred to as the vergence-accommodation conflict (VAC). The conflict is especially problematic in heads-up displays, where virtual imagery is expected to coexist seamlessly with the real-world environment.

Although certain display systems involve directing emitted light so that the virtual imagery appears to originate from a distant plane, these systems still face constraints in reproducing multiple depth cues simultaneously. In particular, when virtual imagery is presented at an apparent infinite focus distance, it may lack natural variation in convergence or parallax, which can diminish realism and user comfort.

Accordingly, there is a need for improved display systems that can present imagery in a manner more consistent with human visual perception, while also addressing the challenges of VAC, parallax realism, and ergonomic factors in heads-up displays and other AR applications.

SUMMARY

The present disclosure seeks to provide a system and method for providing pseudo-multiscopic rendering, capable of improving consistency of visual perception and reducing conflicts between accommodation and convergence in heads-up display and other augmented-reality applications. The aim of the present disclosure is achieved by a system and method that generate or retrieve an image for display via an image-replicating display based on a relative position of an interpupillary midpoint with respect to an image plane of the image-replicating display, as defined in the appended independent claims to which reference is made. Advantageous features, including selective omission of pixels whose light does not reach the user's eyes, control of static or dynamic microlenses based on virtual depth or gaze information, and transparent implementations allowing combination with real-world light fields, are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
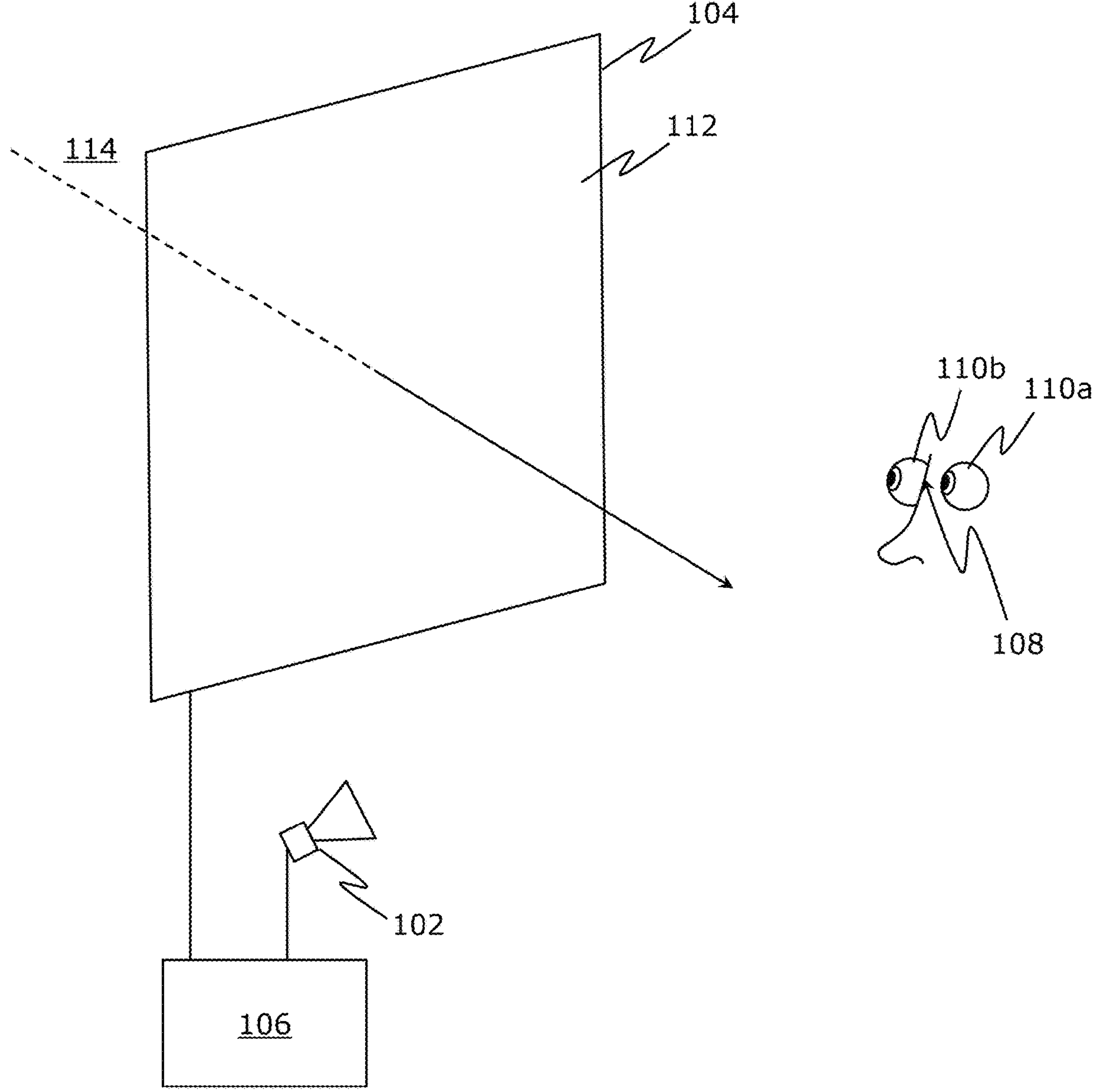
FIG. 1A is a schematic illustration of a system for providing pseudo-multiscopic rendering, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a system comprising:

- a tracker;
- an image-replicating display configured to emit light rays forming a spatially-invariant angular light field from each of a plurality of positions on an exit aperture of the image-replicating display; and
- at least one processor configured to:
  - determine a relative position of an interpupillary midpoint between a first eye and a second eye of a user with respect to an image plane of the image-replicating display, using the tracker;
  - generate or retrieve an image to be displayed based on the relative position of the interpupillary midpoint with respect to the image plane, wherein the image corresponds to a perspective projection having a view origin at the interpupillary midpoint and aligned with an optical axis of the image-replicating display; and display the image via the image-replicating display.

In a second aspect, an embodiment of the present disclosure provides a method comprising:

determining a relative position of an interpupillary midpoint between a first eye and a second eye of a user with respect to an image plane of an image-replicating display, using a tracker;

generating or retrieving an image to be displayed based on the relative position of the interpupillary midpoint with respect to the image plane, wherein the image corresponds to a perspective projection having a view origin at the interpupillary midpoint and aligned with an optical axis of the image-replicating display; and displaying the image via the image-replicating display, wherein the image-replicating display is configured to emit light rays forming a spatially-invariant angular light field from each of a plurality of positions on an exit aperture of the image-replicating display.

Pursuant to the present disclosure, the system and method improve consistency of visual perception and reduce visual discomfort that often arises from conflicts between accommodation and convergence in conventional heads-up displays (HUDs) and other augmented-reality (AR) applications. This is achieved by determining a relative position of an interpupillary midpoint with respect to an image plane of an image-replicating display, generating or retrieving an image corresponding to a perspective projection from the interpupillary midpoint, and displaying the image via the image-replicating display. By using the interpupillary midpoint as a reference viewpoint, the image is geometrically balanced between both eyes, minimizing angular disparities that would otherwise occur when stereo convergence is weak or difficult to measure.

Because the image-replicating display emits light rays forming a spatially-invariant angular light field across its exit aperture, the displayed image maintains head-motion-dependent parallax even as the user moves. This preserves natural perspective cues that conventional displays at apparent infinity fail to reproduce. Alignment of the perspective projection with the optical axis further ensures that the virtual imagery remains stable across the supported eyebox, enhancing visual comfort and integration with the real-world environment.

For virtual objects rendered at distances greater than approximately five metres, the residual angular mismatch between the interpupillary midpoint-based projection and true stereo viewpoints is negligible (e.g., approximately 0.37 degrees at 5 metres, diminishing further at longer distances). Because human depth cues weaken roughly with the inverse of viewing distance, perceptual sensitivity to differences in focus, convergence, and parallax decreases rapidly with increasing distance. As such, there is little perceptual difference between virtual objects rendered at 5 metres and at 50 metres, and accommodation demand between optical infinity and 2 metres differs by only approximately 0.5 dioptres, below typical sensitivity. At roadway distances, these combined factors-optical focus matching stereo convergence, preservation of head-motion parallax, and imperceptible left/right alignment mismatch-ensure that virtual imagery integrates seamlessly with the real-world environment without perceptible artifacts or discomfort.

Accordingly, in HUD use cases where virtual objects are presented at roadway distances, midpoint-based monoscopic projection provides perceptual accuracy without the complexity of true stereo rendering. This approach reduces vergence-accommodation conflict, preserves natural head-motion parallax, and avoids visible misalignment, delivering a stable and realistic visual experience that coexists naturally with the real world while minimizing fatigue and enhancing immersion.

The following table provides a comparative summary of depth cue types and trade-offs between a conventional stereo display system and the system of the present disclosure, highlighting the benefits and drawbacks in HUD use cases.

| Depth cue type | Stereo display | Present system |
|---|---|---|
| Focus distance | Fixed at physical display distance | Optical infinity (+∞) |
| Stereo convergence | Dynamic (per-eye rendered views) | Optical infinity (+∞) |
| Movement parallax | Software-controlled (per head position) | Software-controlled (per head position) |
| Benefits | True independent stereo, supports multi-user scenarios | No vergence-accommodation conflict, smoother parallax, perceptual stability |
| Drawbacks | Stereo crosstalk, residual VAC | No true stereo, minor left/right alignment mismatch, no near-field virtual objects |

It will be appreciated that the system and method are not limited to implementation in an HUD. Rather, they may be employed in a variety of applications, including digital signage, three-dimensional (3D) product demonstrations, and immersive educational or training visualizations, among others.

For illustration purposes only, there will now be described how the aforementioned steps can be performed pursuant to embodiments of the present disclosure.

Determining Relative Position of Interpupillary Midpoint:

The tracker is used to determine relative positions of both the first eye and the second eye of the user with respect to the image plane of the image-replicating display. From these relative positions, a relative position of a midpoint between the first eye and the second eye is calculated, yielding the relative position of the interpupillary midpoint. The relative position of this midpoint with respect to the image plane may include translational offsets in horizontal, vertical, and depth directions, as well as orientation offsets if the user's head is rotated.

The image plane of the image-replicating display can be a light-emitting surface of the display or an imaginary plane that is parallel to the light-emitting surface, in a case where the display is being directly viewed. Alternatively, the image plane can be an imaginary plane in another case where an optical combiner is employed to facilitate a reflected view.

The term "image plane" refers to an intended location in space where at least one virtual object is perceived. This does not require the image-replicating display or other optical elements on the optical path to be physically planar. This definition applies irrespective of the optical configuration of the system, namely:

(i) in a case where a distorted image is displayed on a curved or non-curved display and reflected through a curved combiner, (ii) in a case where an undistorted image is displayed on a non-curved display and reflected through a non-curved combiner, (iii) in a case where an image is displayed on the display and viewed directly (without any optical combiner).

In the present disclosure, the term "tracker" refers to specialised equipment for detecting and/or following positions of eyes of a user and, optionally, a pose (namely, a position and orientation) of a head of the user. In some implementations, the tracker is implemented as at least one tracking camera. The at least one tracking camera may comprise at least one of: at least one visible-light camera, at least one infrared (IR) camera, at least one depth camera. Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of a given depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of different types of cameras (for example, such as the at least one visible-light camera, the at least one IR camera, and the at least one depth camera) may be utilised in the tracker. When different types of tracking images captured by the different types of tracking cameras are utilised, a position of the user's eyes can be determined highly accurately, as results obtained from one type of tracking image can be used to refine results obtained from another type of tracking image. These different types of tracking images may be in the form of at least one of: visible-light images, IR images, depth images. Image processing techniques may then be applied to detect centres of pupils of the user's eyes, from which the interpupillary midpoint is determined.

The result of this step is an accurate relative position of the interpupillary midpoint in a given coordinate space of the image-replicating display (specifically, with respect to its image plane). This allows subsequent image generation/retrieval to be anchored precisely to the interpupillary midpoint of the user. It will be appreciated that the tracker tracks the eyes of the user with a significantly high accuracy and precision, such that an error in determining the relative position may, for example, be minimised to within a tolerance range of approximately (+/−) 8 millimetres.

Generating or Retrieving Image Based on Relative Position:

Once the relative position of the interpupillary midpoint has been determined, an image is generated or retrieved corresponding to a perspective projection whose principal axis is aligned with the optical axis of the image-replicating display, irrespective of lateral offsets of the interpupillary midpoint relative to the optical axis. In this regard, a virtual camera may be defined with its viewpoint located at the interpupillary midpoint and its forward axis parallel to the optical axis of the image-replicating display. When the interpupillary midpoint is offset laterally or vertically from the optical axis, the viewpoint of the virtual camera is displaced from the optical axis, while its forward axis remains aligned with the optical axis of the image-replicating display. This situation corresponds to an off-axis perspective projection. Techniques for implementing perspective and off-axis projections are well known in the art of computer graphics and display rendering, and can be applied here to ensure correct alignment.

The image is generated with a field of view that matches (or contains) the range of viewing directions displayable by the image-replicating display, so that for each pixel on the display, the pixel colour and intensity correspond to the intended virtual object(s) that would be visible to the user (treated as a monoscopic viewer positioned at the interpupillary midpoint) along the corresponding eye-ray direction.

In some implementations, a graphics engine may be employed to generate the image using standard 3D rendering techniques (such as rasterization or ray tracing) from the viewpoint. In other implementations, the image may be retrieved, for example, from a cloud computing service configured to generate images. In yet other implementations, a pre-rendered or prerecorded image corresponding to the relative position of the interpupillary midpoint can be retrieved from a data repository.

In some implementations, the at least one processor may be configured to apply late-stage reprojection after the image has been generated or retrieved, in order to warp the image according to an updated head pose prediction from the tracker. This reduces temporal misalignment between the head position corresponding to the rendering viewpoint and the actual head position at the moment of display refresh. By performing such late-stage reprojection, the system compensates for tracking latency and user head motion between the rendering time and the display time, thereby ensuring that the displayed imagery remains geometrically consistent with the current viewpoint. This further improves stability and realism of the pseudo-multiscopic rendering, particularly in HUD and AR contexts where head movements are frequent and latency must be minimized.

The result of this step is an image that corresponds to the visual perspective of a monoscopic viewer positioned at the interpupillary midpoint, with the viewing direction aligned to the optical axis of the image-replicating display. This guarantees geometric consistency with the image-replicating display while still accounting for user head movement within an eyebox supported by the image-replicating display. As used herein, the term "eyebox" refers to a 3D volume in which a user's pupil can be positioned to view the image displayed by the image-replicating display.

Notably, rendering from the interpupillary midpoint effectively treats the user as a monoscopic viewer located at the interpupillary midpoint between the two eyes. While both eyes receive the emitted light rays, the displayed image is generated as if perceived from a single viewpoint at the midpoint, thereby ensuring geometric balance between the first eye and the second eye. This monoscopic interpretation underlies the pseudo-multiscopic rendering described herein, where head-motion-dependent parallax is preserved without requiring independent stereo image generation for each eye.

It will be appreciated that the generation of the image is based on the relative position of the interpupillary midpoint of a single user. In the context of an HUD in a vehicle, this user could be a driver of the vehicle.

Other users, such as passengers, may also perceive the displayed image; however, the image is not generated from the perspective of their respective interpupillary midpoints, but rather from that of the driver.

Displaying Image Via Image-Replicating Display:

The generated or retrieved image is then displayed via the image-replicating display. Each of the plurality of positions on the exit aperture of the image-replicating display emits light rays forming a spatially-invariant angular light field.

Throughout the present disclosure, the term "image-replicating display" refers to a display configured to emit light rays such that the same angular distribution of light rays is reproduced from multiple positions on an exit aperture. As used herein, the term "spatially-invariant angular light field"

refers to a distribution of light rays emitted from a plurality of positions on the exit aperture, such that the angular distribution—including directions, intensities, and image content represented by the rays—is substantially the same at each of those positions. That is, for each position on the exit aperture, the emitted light rays span the same range of directions and replicate the same image content, thereby ensuring that a user perceives substantially the same image independent of the lateral position of the user's eyes within the supported eyebox. This is in contrast to multi-view or directional displays, in which different portions of an exit aperture emit different angular light rays depending on the viewing position. As used herein, the term "positions in the exit aperture" refers to positions on an output surface of the image-replicating display from which light rays are emitted toward the user.

In some implementations, the image-replicating display is transparent. In a sub-implementation, the image-replicating display may comprise a display unit and a transparent image-replicating waveguide optically coupled to the display unit, wherein the transparent image-replicating waveguide is disposed on an optical path of a real-world light field from a real-world environment. As an example, the transparent image-replicating waveguide may be integrated into a windshield of a vehicle. The transparent image-replicating waveguide is configured to guide the light rays produced by the display unit along a propagation path within the transparent image-replicating waveguide and to emit the light rays along the optical path of the real-world light field. In such a case, the positions on the exit aperture correspond to replicated out-coupling regions of the transparent image-replicating waveguide. A technical benefit of this sub-implementation is that it enables compact integration of virtual imagery with the user's direct view of the real-world environment. This configuration supports thin, lightweight HUD and AR implementations while maintaining precise overlay of virtual objects onto the real scene, thereby improving ergonomics, situational awareness, and immersion.

In other implementations, the image-replicating display is non-transparent and is used in conjunction with an optical combiner arranged on an optical path of the image-replicating display and a real-world light field from the real-world environment. In this case, the image-replicating display may comprise a display unit and a non-transparent image-replicating waveguide optically coupled to the display unit. The positions on the exit aperture correspond to replicated out-coupling regions of the image-replicating waveguide, and may further correspond to optical relay routes from those out-coupling regions via reflection from the optical combiner.

During operation, pixel values of the image are mapped to light-emitting cells or equivalent emission channels of the image-replicating display. The image-replicating display is then driven to display a sequence of images at a refresh rate that is sufficient to maintain continuous perception. Because each position on the exit aperture emits its own spatially-invariant angular light field, the user perceives a stable virtual image whose perspective matches the projection defined by the interpupillary midpoint, even during small head translations within the eyebox.

The result of this step is that the user perceives virtual imagery integrated with the real-world environment, with consistent parallax and reduced risk of vergence-accommodation conflict, thereby achieving a perceptually stable pseudo-multiscopic rendering.

Moreover, optionally, the at least one processor is configured to:

determine pixels of the image whose emitted light rays would not be directed toward any of the first eye and the second eye of the user during display of the image, based on the relative position of the interpupillary midpoint with respect to the image plane or a relative position of a head of the user with respect to the image plane, and dimensions of the exit aperture of the image-replicating display; and when generating the image, omit generating pixel values corresponding to the determined pixels.

Determining which pixels of the image correspond to light rays that will not be directed toward either the first eye or the second eye of the user is performed based on the relative position of the interpupillary midpoint or the head with respect to the image plane, together with the known dimensions of the exit aperture of the image-replicating display. When displayed through the image-replicating display, each pixel of the image corresponds to a unique angular ray direction. Light rays corresponding to that pixel emerge from any position on the exit aperture but only along that angular direction. As a result, pixels appear located at optical infinity, since head movement does not alter their angular direction. However, the finite extent of the exit aperture imposes a limit: once the user's head shifts such that the user's eyes approach the boundaries of the eyebox, certain angular light rays can no longer pass toward the user and thus become invisible.

The system accounts for this effect by determining, for the current relative position of the interpupillary midpoint or the head, which angular directions extend beyond the geometric bounds of the exit aperture. Pixels whose corresponding ray directions would require emission from outside the exit aperture are identified as non-contributing pixels.

Once the non-contributing pixels are identified, generating pixel values for those pixels is omitted. In a rendering pipeline, this may mean skipping shading or rasterization for those pixels, while in a retrieval pipeline, it may mean avoiding retrieval of stored pixel values for those pixels. The result is that image generation is restricted to pixels whose light rays will actually reach at least one of the user's eyes through the exit aperture, avoiding computation for pixels that cannot be perceived given the user's position relative to the exit aperture.

This reduces computational load and power consumption by eliminating pixel values corresponding to light rays that cannot reach the user's eyes due to the finite aperture of the image-replicating display. By ensuring that only perceptually relevant pixels are generated, the system provides an efficiency advantage over conventional displays that render full images regardless of visibility, while maintaining perceptual fidelity. The user perceives a stable, continuous image, and the system avoids wasteful operations.

Furthermore, optionally, the image-replicating display comprises an array of microlenses, wherein each microlens is disposed on an optical path of light rays emitted from a respective position on the exit aperture. Each microlens is placed in front of a respective position on the exit aperture so as to lie on an optical path of light rays emitted from that position. In this arrangement, each position on the exit aperture is optically coupled with a corresponding microlens, and the microlens modifies or conditions the light rays emerging from that position.

The array of microlenses may be arranged as a planar layer aligned with the exit aperture. Alignment of the microlenses with their respective positions may be performed during assembly to ensure that each microlens effectively controls the angular distribution of light rays emerging from its respective position.

Each microlens may be designed to adjust at least one of: divergence, convergence, collimation of the light rays emerging from its respective position. For example, a microlens may ensure that light rays emitted from a position are shaped to match the spatially-invariant angular light field defined for the image-replicating display. In some implementations, microlenses may also reduce optical aberrations, improve uniformity of angular emission, or extend the effective eyebox by guiding rays more efficiently into intended angular directions.

Employing the array of microlenses improves the quality and uniformity of the spatially-invariant angular light field. By placing a microlens in front of each position on the exit aperture, the system ensures that light rays emerging from each position are consistently directed, reducing variability and distortion. As a result, users perceive a more stable and uniform virtual image with reduced aberrations, improved brightness uniformity, and an expanded effective eyebox. Furthermore, by conditioning emission at each position, the array of microlenses increases optical efficiency, ensuring that more light contributes to the intended viewing directions. Accordingly, the use of microlenses addresses limitations of unconditioned emission from exit-aperture positions, enhancing perceptual stability, comfort, and realism in pseudo-multiscopic rendering.

In some implementations, the microlenses in the array comprise static microlenses having fixed focal lengths. Each static microlens is fabricated with a predetermined curvature or profile that defines its focal length. Once fabricated, the optical characteristics of the microlens remain constant during operation.

When placed in front of a respective position on the exit aperture, each static microlens shapes the light rays emitted from that position according to its fixed focal length. For example, the static microlens may collimate divergent rays to form a spatially-invariant angular light field, or it may slightly converge or diverge rays to match the required emission geometry of the image-replicating display.

In some implementations, the focal length of the static microlenses is chosen based on the design of the image-replicating display and the intended eyebox size. For example, a microlens power of +0.5 dioptres may shift the apparent optical focus of the emitted light rays to approximately 2 metres. Alignment of each static microlens with its respective position on the exit aperture ensures consistent angular conditioning across the full array.

Using static microlenses with fixed focal lengths provides a simple and robust means of conditioning the light rays emitted from the exit aperture. Because the optical properties of the microlenses are fixed, the system operates with high stability and minimal complexity. This implementation reduces manufacturing and integration costs compared to dynamic or tunable microlenses, while still ensuring that the emitted light rays from each position are directed consistently to form a stable spatially-invariant angular light field. Users benefit from reduced aberrations, improved brightness uniformity, and perceptual stability without requiring active adjustment mechanisms. Accordingly, the use of static microlenses addresses the need for reliable optical conditioning in image-replicating displays while minimizing system complexity and ensuring long-term durability.

In other implementations, focal lengths of the microlenses are controllable. Optionally, in this regard, the at least one processor is configured to:

determine an average virtual depth at which at least one virtual object is to be presented; and control focal lengths of microlenses in at least a portion of the array, based on the average virtual depth.

Each microlens may be fabricated with a structure that allows its focal length to vary during operation. This controllability can be achieved using technologies such as liquid crystal layers, electrowetting lenses, or deformable membranes, where an applied control signal changes the curvature or effective refractive index of the microlens.

In this regard, the average virtual depth may be determined based on scene geometry in a rendered virtual environment, or it may be retrieved from metadata corresponding to the image (for example, in case of prerecorded images). Once the average virtual depth is determined, the processor is configured to generate control signals to adjust focal lengths of microlenses in at least a portion of the array so that their conditioned emission aligns with the angular distribution required for the average virtual depth.

To identify which microlenses should be adjusted, the processor may be configured to determine a portion of the exit aperture whose emitted light rays are directed toward the first eye and the second eye of the user. This determination is based on the relative position of the interpupillary midpoint with respect to the image plane, or alternatively on the relative position of the head with respect to the image plane, as determined using the tracker. Because the system already tracks the relative positions of the user's eyes, it can calculate which portion of the exit aperture emits light rays toward the eyes, even if those light rays are not directed toward any other viewer. By knowing the head position relative to the image plane, the system can simulate the parallax effect of virtual objects that are not infinitely far away. For example, given a head position and a virtual object located at an apparent angular offset (such as 10 degrees to the left of the optical axis), the portion on the exit aperture from which the specific light rays that reach the eyes are emitted can be determined. The focal lengths of microlenses in the portion of the array corresponding to said portion on the exit aperture are then controlled so that their emission correctly represents the average virtual depth. Alternatively, focal lengths of microlenses across an entirety of the array may be controlled according to the average virtual depth.

Using microlenses with controllable focal lengths enables the system to adaptively condition the emitted light rays to reproduce parallax effects of virtual objects at finite depths. By determining which portion of the exit aperture contributes light rays toward the user's eyes, and adjusting the focal lengths of the microlenses in the corresponding portion of the array based on an average virtual depth, the system ensures that the displayed imagery reflects the intended spatial placement of the virtual objects. This adaptive control reduces mismatches between convergence and accommodation, enhances realism by providing head-motion-dependent parallax consistent with natural vision, and improves depth perception and comfort for the user. Moreover, by restricting focal length adjustments to the portions of the exit aperture that actually contribute rays to the user's eyes, the system improves efficiency and avoids unnecessary processing, thereby combining perceptual accuracy with reduced actuation complexity.

Additionally, optionally, when determining the average virtual depth, the at least one processor is configured to apply different weights to at least one of: different virtual objects, different portions of the at least one virtual object, based on at least one of: respective positions of the different virtual objects in the image plane, respective positions of the different portions of the at least one virtual object in the image plane.

In this regard, the virtual scene presented by the displayed image may be analysed to identify the different virtual objects. Each virtual object has a respective position in the image plane, which may be characterised by parameters such as lateral location, angular extent, or projected area. A virtual object located near the optical axis of the image-replicating display, or occupying a larger portion of the image plane, may be assigned a higher weight than a peripheral or smaller object.

Additionally, weighting may be applied within a single virtual object. Portions of the virtual object closer to the optical axis or corresponding to regions of higher visual salience (for example, foreground edges of a graphical overlay) may be assigned higher weight than peripheral portions. This allows the calculated average virtual depth to emphasize the most perceptually relevant portions of the virtual object.

The weights are then incorporated to determine the average virtual depth, such that the determined average virtual depth reflects a weighted contribution of the different virtual objects and/or different portions of the at least one virtual object rather than a uniform mean. This ensures that focal length adjustments of the microlenses, described earlier, are based on a virtual depth measure that prioritizes perceptually significant image regions.

Using weighted determination of the average virtual depth enables the system to adaptively prioritize virtual objects or object portions that are more perceptually significant to the user. By assigning higher weights to virtual objects near the optical axis or occupying larger regions of the image plane, the system ensures that focal length adjustments of the microlenses align with the depth most relevant to user perception. This reduces the risk of perceptual inconsistency that could arise if small or peripheral objects were given equal influence over the average depth calculation. For example, without weighting, a distant peripheral object could disproportionately skew the average virtual depth away from the main virtual object of focus, resulting in less accurate accommodation cues.

Accordingly, weighting improves depth realism, reduces vergence-accommodation conflict, and enhances perceptual comfort by ensuring that focal length control is guided by the visual importance of displayed virtual objects. At the same time, the system maintains computational efficiency by applying weighting rules during the depth calculation step, without requiring additional complex rendering operations.

Moreover, optionally, the at least one processor is configured to:

determine gaze directions of the first eye and the second eye, using the tracker;

determine a virtual object or a portion of the virtual object at which the user is looking, based on the gaze directions of the first eye and the second eye; and control focal lengths of microlenses in at least a portion of the array, based on a virtual depth at which the virtual object or the portion of the virtual object is to be presented.

The tracker may include at least one of: at least one visible-light camera, at least one infrared camera, at least one depth camera, as described earlier. Image processing techniques may be employed to identify the centres of the pupils and corneal reflections for each eye, wherefrom the gaze directions of the first eye and the second eye may be determined.

Based on the gaze directions of the first eye and the second eye, the virtual object or the portion of the virtual object at which the user is looking are determined. This determination may involve intersecting the gaze directions with the image plane or a rendered 3D scene to identify the virtual object or the portion thereof at which the user is looking. For example, if both the gaze directions converge on a region of the image plane that corresponds to a given virtual object, it is determined that the user is directly looking at the given virtual object. In case of non-convergence of the gaze directions, the gaze direction of a dominant eye of the user may be considered to determine the virtual object or the portion thereof.

Once the virtual object or the portion being fixated is determined, the virtual depth at which that virtual object or portion is to be presented is determined. The focal lengths of microlenses in at least the portion of the array corresponding to the portion of the exit aperture that emits light rays toward the user's eyes from that virtual object or portion are then controlled according to the determined virtual depth. As described earlier, the portion of the exit aperture is identified using the tracked relative position of the interpupillary midpoint or head with respect to the image plane. In this way, the system ensures that microlenses condition the emission of light rays for the portion of the exit aperture whose emitted light rays are actively being viewed by the user. Alternatively, the focal lengths of the microlenses across the entirety of the array may be controlled according to the determined virtual depth.

Using gaze-contingent control of microlens focal lengths allows the system to dynamically adapt optical conditioning to the precise region of the virtual scene that the user is currently looking at. By tailoring focal lengths to the virtual depth of the virtual object or the portion thereof, the system provides accommodation cues that match the user's natural vergence response. This alignment directly reduces vergence-accommodation conflict, one of the primary causes of visual discomfort in HUD and AR display systems.

Moreover, by restricting focal length changes to the portions of the exit aperture that actually contribute rays to the user's eyes, the system improves efficiency and avoids unnecessary processing, thereby combining perceptual accuracy with reduced actuation complexity.

As a result, the user experiences more natural depth perception, with virtual imagery that responds dynamically to shifts in gaze. The combination of gaze tracking and gaze-contingent microlens control improves immersion, reduces fatigue, and enhances the seamless integration of virtual objects and real-world objects.

Furthermore, optionally, the at least one processor is configured to:

determine a virtual depth at which at least one virtual object is to be presented;

determine a portion of the exit aperture of the image-replicating display whose emitted light rays are directed toward the first eye and the second eye of the user, based on the relative position of the interpupillary midpoint with respect to the image plane or the relative position of the head of the user with respect to the image plane; and control focal lengths of microlenses disposed on respective optical paths of positions on said portion of the exit aperture, based on the virtual depth at which the at least one virtual object is to be presented.

As described earlier, the virtual depth may be determined from scene geometry in a rendered environment, or retrieved from metadata corresponding to the image. The portion of the exit aperture whose emitted light rays are directed toward the first eye and the second eye of the user can be determined based on the relative position of the interpupillary midpoint with respect to the image plane, or alternatively on the relative position of the head with respect to the image plane, as determined using the tracker. This determination can be performed as described earlier.

Once the portion of the exit aperture has been determined, the focal lengths of the microlenses disposed on the respective optical paths of the positions within that portion of the exit aperture are controlled. The focal lengths of the microlenses are adjusted according to the virtual depth of the object to be presented, so that the conditioned emission of light rays matches the angular distribution required for that virtual depth.

Restricting microlens focal length control to the portion of the exit aperture that contributes light rays to the user's eyes enables the system to deliver depth-adaptive conditioning with greater efficiency. Instead of adjusting microlenses across the entire array, the system concentrates control only on the active portion through which the virtual object is visible to the user.

This targeted adjustment reduces processing load and actuation complexity, while still ensuring that the light rays contributing to the user's perception are conditioned to represent the determined virtual depth. As a result, the user perceives a virtual object with natural depth cues, reduced vergence-accommodation conflict, and enhanced visual comfort.

At the same time, efficiency is improved because focal length control is applied only where needed, conserving power and reducing unnecessary microlens actuation. This balance of perceptual accuracy with resource efficiency ensures high-quality depth rendering in demanding HUD and AR contexts.

The present disclosure also relates to the method as described above. Various embodiments and variants disclosed above, with respect to the aforementioned first aspect, apply mutatis mutandis to the method.

Optionally, the method further comprises:

determining pixels of the image whose emitted light rays would not be directed toward any of the first eye and the second eye of the user during display of the image, based on the relative position of the interpupillary midpoint with respect to the image plane or a relative position of a head of the user with respect to the image plane, and dimensions of the exit aperture of the image-replicating display; and when generating the image, omitting generating pixel values corresponding to the determined pixels.

By omitting pixel values corresponding to the light rays that would not reach the first eye or the second eye, the method reduces computational load and power consumption while maintaining perceptual fidelity. Rendering is restricted to perceptually relevant pixels, ensuring efficient use of computational resources without compromising the stability or continuity of the displayed image.

Moreover, optionally, the image-replicating display comprises an array of microlenses, wherein each microlens is disposed on an optical path of light rays emitted from a respective position on the exit aperture. Employing the array of microlenses improves the quality and uniformity of the spatially-invariant angular light field. Each microlens conditions the light rays emitted from its respective position on the exit aperture, reducing aberrations, improving brightness uniformity, and extending the effective eyebox. As a result, the user perceives more stable and comfortable virtual imagery with enhanced optical efficiency.

In some implementations, the microlenses in the array comprise static microlenses having fixed focal lengths. Using static microlenses with fixed focal lengths provides stable and reliable optical conditioning of emitted light rays without requiring active adjustment. This reduces complexity and cost while ensuring consistent collimation or convergence across the exit aperture. As a result, the user benefits from durable, low-maintenance operation with uniform visual quality and perceptual stability.

In other implementations, focal lengths of the microlenses are controllable. Optionally, in this regard, the method further comprises:

determining an average virtual depth at which at least one virtual object is to be presented; and controlling focal lengths of microlenses in at least a portion of the array, based on the average virtual depth.

Controlling the focal lengths of the microlenses based on the average virtual depth enables adaptive conditioning of emitted light rays so that accommodation cues align with the intended placement of virtual objects. This reduces vergence-accommodation conflict, enhances realism of depth perception, and improves user comfort. By applying adjustments only to the portion of the array contributing light rays toward the eyes, the method further achieves perceptual accuracy with reduced actuation effort and power consumption.

Additionally, optionally, determining the average virtual depth comprises applying different weights to at least one of: different virtual objects, different portions of the at least one virtual object, based on at least one of: respective positions of the different virtual objects in the image plane, respective positions of the different portions of the at least one virtual object in the image plane. Applying weights when determining the average virtual depth ensures that focal length control prioritizes perceptually significant virtual objects or object portions, such as those near the optical axis or occupying larger regions of the image plane. This improves the realism of depth cues, reduces the risk of perceptual inconsistencies from small or peripheral objects, and enhances user comfort, while maintaining efficiency by incorporating weighting directly into the depth calculation process.

Moreover, optionally, the method further comprises:

determining gaze directions of the first eye and the second eye, using the tracker;

determining a virtual object or a portion of the virtual object at which the user is looking, based on the gaze directions of the first eye and the second eye; and controlling focal lengths of microlenses in at least a portion of the array, based on a virtual depth at which the virtual object or the portion of the virtual object is to be presented.

By adapting microlens focal lengths according to the virtual depth of the object or portion currently fixated by the user, the method delivers accommodation cues aligned with natural vergence. This gaze-contingent adjustment reduces vergence-accommodation conflict, enhances realism by dynamically matching depth to visual attention, and improves efficiency when adjustments are restricted to portions of the exit aperture that contribute light rays toward the user's eyes.

Furthermore, optionally, the method further comprises:

determining a virtual depth at which at least one virtual object is to be presented;

determining a portion of the exit aperture of the image-replicating display whose emitted light rays are directed toward the first eye and the second eye of the user, based on the relative position of the interpupillary midpoint with respect to the image plane or a relative position of a head of the user with respect to the image plane; and controlling focal lengths of microlenses disposed on respective optical paths of positions on said portion of the exit aperture, based on the virtual depth at which the at least one virtual object is to be presented.

By restricting microlens focal length control to the portion of the exit aperture that actually contributes light rays toward the user's eyes, the method ensures that only perceptually relevant portions are depth-conditioned. This targeted adjustment improves perceptual accuracy while reducing processing load, actuation complexity, and power consumption, thereby delivering efficient and comfortable depth rendering in HUD and AR applications.

Moreover, in some implementations, the image-replicating display is transparent. Implementing the method with a transparent image-replicating display allows virtual imagery to be overlaid directly on the real-world environment, supporting natural see-through HUD and AR experiences. This integration enhances situational awareness and usability while preserving alignment between virtual objects and the real objects.

Optionally, in this regard, the image-replicating display comprises a display unit and a transparent image-replicating waveguide optically coupled to the display unit, the transparent image-replicating waveguide being disposed on an optical path of a real-world light field from a real-world environment, wherein the transparent image-replicating waveguide is configured to guide the light rays produced by the display unit along a propagation path within the transparent image-replicating waveguide and to emit the light rays along the optical path of the real-world light field. Using a transparent image-replicating waveguide optically coupled to the display unit enables compact integration of virtual imagery with the user's direct view of the real-world environment. This configuration supports thin, lightweight HUD and AR implementations while maintaining precise overlay of virtual objects onto the real objects, thereby improving ergonomics, situational awareness, and immersion.

DETAILED DESCRIPTION OF THE DRAWINGS

FIG. 1A is a schematic illustration of a system 100 for providing pseudo-multiscopic rendering, in accordance with an embodiment of the present disclosure. The system 100 comprises a tracker 102, an image-replicating display 104 and at least one processor, depicted as a processor 106.

The processor 106 is configured to:

determine a relative position of an interpupillary midpoint 108 between a first eye 110*a* and a second eye 110*b* of a user with respect to an image plane 112 of the image-replicating display 104, using the tracker 102;

generate or retrieve an image to be displayed based on the relative position of the interpupillary midpoint 108 with respect to the image plane 112, wherein the image corresponds to a perspective projection having a view origin at the interpupillary midpoint 108 and aligned with an optical axis 114 of the image-replicating display 104; and display the image via the image-replicating display 104.

Figure 1B:
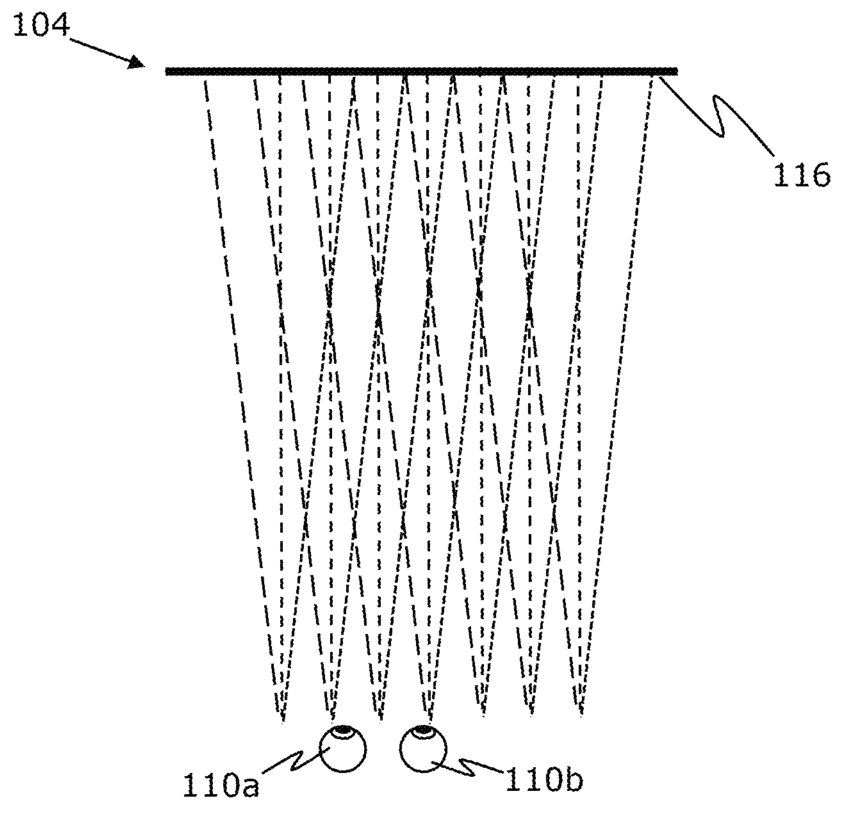
FIG. 1B is a side view of an image-replicating display depicting how spatially-invariant angular light field is produced by a plurality of positions across an exit aperture, in accordance with an embodiment of the present disclosure.

FIG. 1B is a side view of the image-replicating display 104, in accordance with an embodiment of the present disclosure. The image-replicating display 104 is configured to emit light rays forming a spatially-invariant angular light field from each of a plurality of positions on an exit aperture 116 of the image-replicating display 104. For the sake of clarity, only a portion of the image-replicating display 104 is shown for illustration purposes.

Figure 1C:
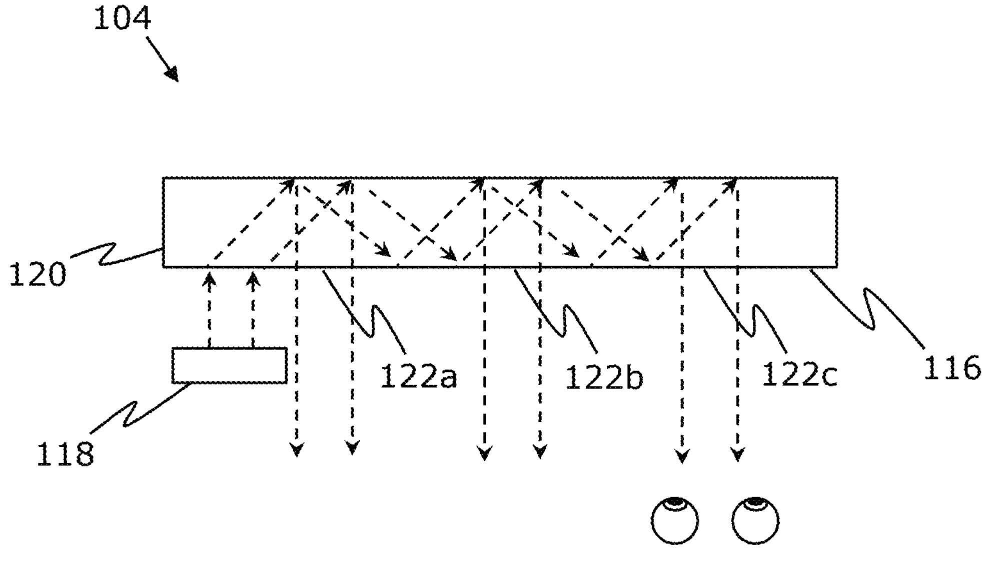
FIG. 1C is a schematic illustration of a specific implementation in which the image-replicating display is implemented using a transparent image-replicating waveguide, in accordance with an embodiment of the present disclosure.

FIG. 1C is a schematic illustration of a specific implementation of the image-replicating display 104, in accordance with an embodiment of the present disclosure. In the specific implementation, the image-replicating display comprises a display unit 118 and a transparent image-replicating waveguide 120 optically coupled to the display unit 118. The transparent image-replicating waveguide 120 is disposed on an optical path of a real-world light field from a real-world environment. The transparent image-replicating waveguide 120 is configured to guide the light rays produced by the display unit 118 along a propagation path within the transparent image-replicating waveguide 120 and to emit the light rays along the optical path of the real-world light field. In FIG. 1C, there are shown a plurality of positions (depicted as positions 122*a*-122*c*) on the exit aperture 116. The positions 122*a*-122*c* correspond to replicated out-coupling regions of the transparent image-replicating waveguide 120. For the sake of clarity, only a portion of the transparent image-replicating waveguide 120 is shown for illustration purposes.

Figure 1D:
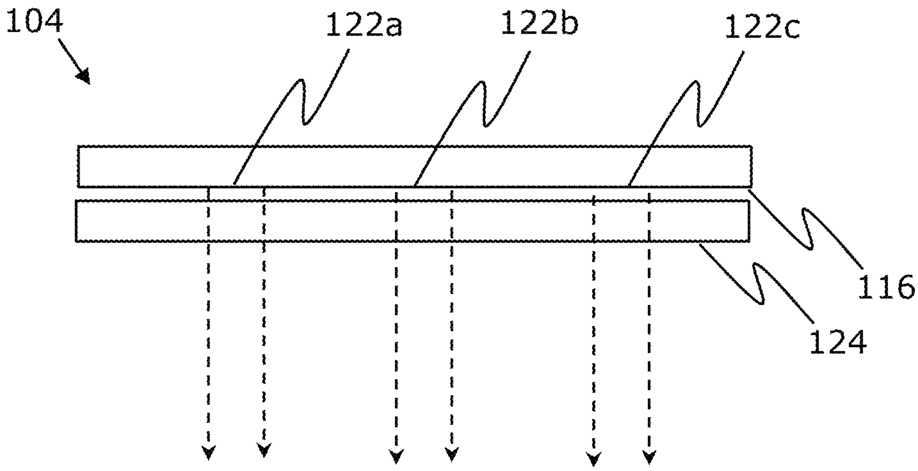
FIG. 1D is a schematic illustration of the image-replicating display, in accordance with an optional embodiment of the present disclosure, where the image-replicating display comprises an array of microlenses.

FIG. 1D is a schematic illustration of the image-replicating display 104, in accordance with an optional embodiment of the present disclosure. Optionally, the image-replicating display 104 comprises an array 124 of microlenses, wherein each microlens is disposed on an optical path of light rays emitted from a respective position 122*a*-122*c* on the exit aperture 116. Each position 122*a*-122*c* on the exit aperture 116 is optically coupled with a corresponding microlens, and the microlens modifies or conditions the light rays emerging from that position. For the sake of illustration, only simplified light rays are depicted. Notably, each microlens may be designed to adjust at least one of: divergence, convergence, collimation of the light rays emerging from its respective position.

It may be understood by a person skilled in the art that FIGS. 1A-1C include simplified example implementations of the system 100 and how it works, for sake of clarity, which should not unduly limit the scope of the claims herein. It is to be understood that the specific implementation of the system 100 is not to be construed as limiting it to specific numbers or types of trackers, image-replicating displays, processors, positions on the exit aperture, and the array of microlenses. The person skilled in the art will recognize many variations, alternatives, and modifications of embodiments of the present disclosure.

Figure 2:
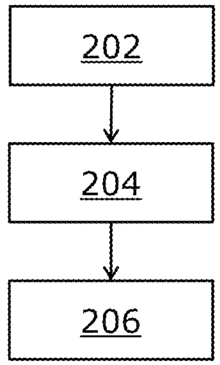
FIG. 2 depicts steps of a method for providing pseudo-multiscopic rendering, in accordance with an embodiment of the present disclosure.

Referring to FIG. 2, illustrated are steps of a method for providing pseudo-multiscopic rendering, in accordance with an embodiment of the present disclosure. At step 202, a relative position of an interpupillary midpoint between a first eye and a second eye of a user with respect to an image plane of an image-replicating display is determined using a tracker. At step 204, an image to be displayed is generated or retrieved based on the relative position of the interpupillary midpoint with respect to the image plane, wherein the image corresponds to a perspective projection having a view origin at the interpupillary midpoint and aligned with an optical axis of the image-replicating display. At step 206, the image is displayed via the image-replicating display, wherein the image-replicating display is configured to emit light rays forming a spatially-invariant angular light field from each of a plurality of positions on an exit aperture of the image-replicating display.

The aforementioned steps are only illustrative and other alternatives can also be provided where one or more steps are added, without departing from the scope of the claims herein.

The invention claimed is:

1. A system comprising:
a tracker;
an image-replicating display configured to emit light rays forming a spatially-invariant angular light field from each of a plurality of positions on an exit aperture of the image-replicating display; and
at least one processor configured to:
determine a relative position of an interpupillary midpoint between a first eye and a second eye of a user with respect to an image plane of the image-replicating display, using the tracker;
generate or retrieve an image to be displayed based on the relative position of the interpupillary midpoint with respect to the image plane, wherein the image corresponds to a perspective projection having a view origin at the interpupillary midpoint and aligned with an optical axis of the image-replicating display; and
display the image via the image-replicating display.

2. The system of claim 1, wherein the at least one processor is configured to:
determine pixels of the image whose emitted light rays would not be directed toward any of the first eye and the second eye of the user during display of the image, based on the relative position of the interpupillary midpoint with respect to the image plane or a relative position of a head of the user with respect to the image plane, and dimensions of the exit aperture of the image-replicating display; and
when generating the image, omit generating pixel values corresponding to the determined pixels.

3. The system of claim 1, wherein the image-replicating display comprises an array of microlenses, wherein each microlens is disposed on an optical path of light rays emitted from a respective position on the exit aperture.

4. The system of claim 3, wherein the at least one processor is configured to:
determine an average virtual depth at which at least one virtual object is to be presented; and
control focal lengths of microlenses in at least a portion of the array, based on the average virtual depth.

5. The system of claim 4, wherein when determining the average virtual depth, the at least one processor is configured to apply different weights to at least one of: different virtual objects, different portions of the at least one virtual object, based on at least one of: respective positions of the different virtual objects in the image plane, respective positions of the different portions of the at least one virtual object in the image plane.

6. The system of claim 3, wherein the at least one processor is configured to:
determine gaze directions of the first eye and the second eye, using the tracker;
determine a virtual object or a portion of the virtual object at which the user is looking, based on the gaze directions of the first eye and the second eye; and
control focal lengths of microlenses in at least a portion of the array, based on a virtual depth at which the virtual object or the portion of the virtual object is to be presented.

7. The system of claim 3, wherein the at least one processor is configured to:
determine a virtual depth at which at least one virtual object is to be presented;
determine a portion of the exit aperture of the image-replicating display whose emitted light rays are directed toward the first eye and the second eye of the user, based on the relative position of the interpupillary midpoint with respect to the image plane or a relative position of a head of the user with respect to the image plane; and
control focal lengths of microlenses disposed on respective optical paths of positions on said portion of the exit aperture, based on the virtual depth at which the at least one virtual object is to be presented.

8. The system of claim 3, wherein the microlenses in the array comprise static microlenses having fixed focal lengths.

9. The system of claim 1, wherein the image-replicating display is transparent.

10. The system of claim 1, wherein the image-replicating display comprises:
a display unit; and
a transparent image-replicating waveguide optically coupled to the display unit, the transparent image-replicating waveguide being disposed on an optical path of a real-world light field from a real-world environment,
wherein the transparent image-replicating waveguide is configured to guide the light rays produced by the display unit along a propagation path within the transparent image-replicating waveguide and to emit the light rays along the optical path of the real-world light field.

11. A method comprising:
determining a relative position of an interpupillary midpoint between a first eye and a second eye of a user with respect to an image plane of an image-replicating display, using a tracker;
generating or retrieving an image to be displayed based on the relative position of the interpupillary midpoint with respect to the image plane, wherein the image corresponds to a perspective projection having a view origin at the interpupillary midpoint and aligned with an optical axis of the image-replicating display; and
displaying the image via the image-replicating display, wherein the image-replicating display is configured to emit light rays forming a spatially-invariant angular light field from each of a plurality of positions on an exit aperture of the image-replicating display.

12. The method of claim 11, further comprising:
determining pixels of the image whose emitted light rays would not be directed toward any of the first eye and the second eye of the user during display of the image, based on the relative position of the interpupillary midpoint with respect to the image plane or a relative position of a head of the user with respect to the image plane, and dimensions of the exit aperture of the image-replicating display; and
when generating the image, omitting generating pixel values corresponding to the determined pixels.

13. The method of claim 11, wherein the image-replicating display comprises an array of microlenses, wherein each microlens is disposed on an optical path of light rays emitted from a respective position on the exit aperture.

14. The method of claim 13, further comprising:

determining an average virtual depth at which at least one virtual object is to be presented; and controlling focal lengths of microlenses in at least a portion of the array, based on the average virtual depth.

15. The method of claim 14, wherein determining the average virtual depth comprises applying different weights to at least one of: different virtual objects, different portions of the at least one virtual object, based on at least one of: respective positions of the different virtual objects in the image plane, respective positions of the different portions of the at least one virtual object in the image plane.

16. The method of claim 13, further comprising:

determining gaze directions of the first eye and the second eye, using the tracker;

determining a virtual object or a portion of the virtual object at which the user is looking, based on the gaze directions of the first eye and the second eye; and controlling focal lengths of microlenses in at least a portion of the array, based on a virtual depth at which the virtual object or the portion of the virtual object is to be presented.

17. The method of claim 13, further comprising:

determining a virtual depth at which at least one virtual object is to be presented;

determining a portion of the exit aperture of the image-replicating display whose emitted light rays are directed toward the first eye and the second eye of the user, based on the relative position of the interpupillary midpoint with respect to the image plane or a relative position of a head of the user with respect to the image plane; and controlling focal lengths of microlenses disposed on respective optical paths of positions on said portion of the exit aperture, based on the virtual depth at which the at least one virtual object is to be presented.

* * * * *